Patented Feb. 6, 1951

2,540,633

UNITED STATES PATENT OFFICE 2,540,633

OXIDIZED AMMONIACAL SOLUTION OF METHYLENE RESORCINOL AND A PROCESS OF MAKING IT

Joseph D. Rourk, Hohokus, N. J., assignor to United States Rubber Company, New York, N. Y., a corporation of New Jersey No Drawing. Application June 7, 1947, Serial No. 753,377

9 Claims. (Cl. 106—22)

1

This invention relates to a color base and to the process of making same. More particularly it relates to the preparation of an ink which can be formulated either as writing ink or as printing ink.

The principal object of the present invention is to provide a novel color base and process of making same. Another object is to provide a novel ink and process of making same. Another object is to provide a color base which has high activity toward cellulose. Another object is to provide a color base of the foregoing type which can be formulated either as a writing ink, a printing ink or a textile dye. Another object is to provide a color base which can be manufactured, stored, handled and shipped in the form of a dry powder which can be readily converted by the user at the point and time of use into the desired coloring composition such as ink, textile printing paste, textile dye, etc. Many other objects will more fully hereinafter appear.

I have now discovered that a color base having unusual properties can be prepared by oxidizing an aqueous ammoniacal solution of a water-soluble resorcinol-formaldehyde condensation product. For example if a water solution of a water-soluble resorcinol-formaldehyde resin (such as one made by the reaction of one mol of resorcinol with 0.6 mol of formaldehyde, although I can use any water-soluble resorcinol-formaldehyde condensation product) is treated with ammonia and then oxidized either by allowing to stand for a few days in the air or by bubbling air therethrough for a few hours, it turns to a dark blue-black, opaque color and is water-soluble. The resulting solution may be used directly as a writing or printing ink, depending upon the concentration. When the ink is applied to paper, it flows readily, has good covering power and dries to a color ranging from dark brown to black, depending on the concentration. If the concentration is made sufficiently high the material will be paste-like in consistency so that it can be used as a printing ink. It is permanent and will not smear or smudge when a sample of writing on paper is smeared with water. It displays remarkable activity toward cellulose and because of this property it can be used as a textile dye as, for example, in a textile printing paste or dyeing bath.

The color base of the present invention is formed essentially from a water-soluble resorcinol-formaldehyde condensation product by oxidation in the presence of ammonia. This color base does not need the introduction of any pigment or dye or other coloring agent of any kind in it, since its color is formed inherently by a chemical reaction.

The water-soluble resorcinol-formaldehyde resin used in carrying out the present invention may be made in any manner known to the art. The resin is used in what is known as the "A" stage of condensation, that is while it is still in the water-soluble stage. Such resins may be made by heating an aqueous mixture of resorcinol and formaldehyde, with or without catalysts or condensation agents known to the art such as weak organic acids such as oxalic acid, citric acid, tartaric acid, etc. or dilute inorganic acids such as sulfuric acid, hydrochloric acid or the like at a temperature of from 40 to 100° C. until the desired reaction is complete. It is often highly desirable to add the formaldehyde gradually over a substantial period of time to the agitated solution of resorcinol and the catalyst in such manner that the added formaldehyde reacts substantially immediately with the resorcinol and that no substantial excess of free formaldehyde is present. Heating of the reaction mixture may then be continued until the reaction is essentially complete. In some cases it may be desirable to reflux the reaction mixture throughout the addition of the formaldehyde and thereafter until reaction is complete. Upon cooling of the resulting mixture there is obtained an aqueous solution of the condensation product. The mol ratio of resorcinol to formaldehyde may vary widely but typically will range from 1.5:1 to 2:1. If two mols of resorcinol are reacted with one mol of formaldehyde a condensation product identifiable as methylene diresorcinol may be obtained.

It is well within the present-day skill of the art to select proportions of reactants, of catalyst and of water, and conditions of reaction which will yield a water-soluble, "A" stage, resorcinol-formaldehyde condensation product. Furthermore water-soluble resorcinol-formaldehyde resins are articles of commerce and if desired such commercial condensation products may be used as the starting material for the practice of the present invention.

In the practice of the present invention a solution of the water-soluble resorcinol-formaldehyde condensation product in aqueous ammonia is first prepared and this solution is oxidized in any suitable manner, typically by bubbling air or other oxygen-containing gas therethrough. The concentration of the resorcinol-formaldehyde condensation product in the initial solution may vary widely depending primarily upon the desired concentration of the color base formed by the oxidation. The concentration of the condensation product will often range from 30% to 60% by weight of the solution. The proportion of ammonia in the initial solution may similarly vary widely but is preferably sufficient to impart to the mixture a pH of at least 7.5 and will often range from 0.25 to 1% by weight of ammonia ($NH_3$) based on the weight of resorcinol-formaldehyde condensation product. These limits on amount of ammonia refer to free ammonia, exclusive of any ammonia which combines with any acidic material present, such as acid catalyst. More ammonia may be used but serves no useful purpose.

The oxidizing step whereby the color base is produced may be conducted in a wide variety of ways. For example an oxidizing agent in the form of a liquid which is miscible with the aqueous ammoniacal resin solution may be commingled intimately with the solution of the resin. Examples are the addition of aqueous solutions of water-soluble oxidizing agents such as hydrogen peroxide, potassium persulfate, etc. In some cases a solid oxidizing agent may be added directly to the resin solution. It is preferred however to use an oxygen-containing gas as the oxidizing agent. Ordinary atmospheric air is very suitable. Thus the ammoniacal resin solution may simply be allowed to stand in the air for an extended period, for example a few days, whereupon it develops the dark blue, opaque color attributable to the formation of the color base of the present invention. I prefer however to bubble the oxygen-containing gas such as air through the ammoniacal aqueous resin solution. Blowing of air through the solution effects very rapid formation of the color base, often in a matter of hours or less, say within ½ to 5 hours. Bubbling of the air through the solution accomplishes the desired agitation of the mixture, promoting the desired intimate contact of all of the resin solution with the oxygen of the air. Instead of air, I may use pure oxygen but I prefer to use air on the grounds of economy and because the air furnishes its own diluent which may be desirable.

The oxidation is usually conducted at ordinary atmospheric temperature, say from 15 to 25° C., although lower or higher temperatures may be employed. Preferably the temperature does not exceed 50° C.

Essentially complete oxidation of the ammoniacal resin is desirable and to this end the oxidation should be conducted under such conditions and for such a period of time that essentially all of the resin has been converted to the desired color base.

The product of the oxidation is a water solution of the color base and it may be used in this form directly as an ink, dye or coloring medium. Shipment, storage and handling of the color base in this form are often difficult or impracticable. I have found that the color base may be precipitated as a reddish-black water-insoluble solid by simple acidification of the aqueous solution of the blue-black color base. For example the addition of enough weak aqueous acid, such as acetic, sulfuric, etc., throws down the reddish-black water-insoluble precipitate which may then be filtered off, washed with water and dried. The resulting powder may easily be shipped, stored or handled and may subsequently be re-dissolved in aqueous ammonia, for example in a 1% ammonia solution, to yield the aqueous blue-black solution which, depending upon the concentration, may be used as a writing ink, as a printing ink or as a textile dye. The concentration of ammonia in the aqueous ammonia solution employed to re-dissolve the powder may vary, say from ½ to 10%. The amount of $NH_3$ required for re-solution of the powder will be proportional to the amount of the powder and may range from 0.25 to 1% thereof.

Following are illustrative non-limiting examples of the practice of my invention.

Example 1

(a) The resorcinol-formaldehyde resin (resorcinol 1 mol/formaldehyde 0.6 mol) from which the ink was prepared was made as follows:

| | Gms. |
|---|---|
| Resorcinol | 100 |
| Water | 100 |
| Oxalic acid | 2 |
| Formalin (37% $CH_2O$) | 50 |

The resorcinol was dissolved in water and the oxalic acid added. The mixture was stirred with a mechanical stirrer in a 400 cc. beaker immersed in a water bath heated by an electric hot plate. The formalin was added over 40 minutes from a dropping funnel while the mixture was stirred rapidly and heated at 70°-73° C. When all the formalin had been added, the mixture was stirred for an additional two hours while being maintained at the same temperature. It was cooled to room temperature and aqueous ammonia (28%) was added (about 3% by weight based on the weight of the resin) until the solution became slightly alkaline (e. g., pH=7.6). Air was then bubbled into the mixture at a rapid rate, the mixture turning a dark blue-black color within half an hour.

The resulting solution was an excellent ink. Tried as a writing ink, it flowed readily, had good covering power and dried nearly black. It did not run or smudge when a sample of writing on paper was smeared with water. In another experiment, some of the ink was smeared on some cotton cheesecloth. After washing out the excess, the cheesecloth remained a light blue color which showed no further signs of washing out. This indicated its value as a cellulose dye.

(b) In another experiment, the same amount of the same acid resin was treated with 10 gms. of sodium hydroxide in 30 cc. of water upon the completion of the resin-forming reaction. This soluble, alkaline resin was divided in half, one portion being treated with ammonia (about 3% of 28% aqueous ammonia based on the weight of the resin), the other portion untreated. Air was bubbled into each for the same period of time, namely 4 hours. The portion treated with ammonia turned to the dark blue-black color described above, while the portion containing sodium hydroxide remained unchanged. This experiment shows the importance of the ammonia in forming the chromophore group. Hydrogen peroxide has been shown to give the same colored compound when used to carry out the oxidizing process instead of air. This method is more rapid.

Example 2

Two mols of resorcinol were dissolved in its own weight of water. Oxalic acid in the amount of 1% of the weight of resorcinol was dissolved in this resorcinol solution. One mol of formaldehyde as formalin was then added and the mixture stirred at room temperature. The mixture was allowed to stand one half an hour at room temperature; it was then heated to 80–90° C., forming a deep amber solution of methylene diresorcinol. Aqueous ammonia (28%) was added (about 3% based on the weight of the resin) to the resulting solution until the solution had a pH of 7.6. When this solution was oxidized with air or by a catalyst capable of liberating oxygen such as hydrogen peroxide or potassium persulfate a dark blue-black solution was formed.

Example 3

Two different commercial resins of the water-soluble resorcinol-formaldehyde type were each dissolved in 1% ammonia solution, to make a 50% solution and air was bubbled in for 3 to 4 hours. Both materials turned to the same blue-black color and acted in every way like the ink in Example 1.

Example 4

A 10 cc. sample of the ink of Example 1(a) was treated with 5 cc. of a 10% acetic acid solution. A reddish-black, water-insoluble precipitate formed, which was filtered and washed, and then treated with 1% ammonia solution whereupon it immediately re-dissolved to form the blue-black ink of Example 1. This experiment indicated the feasibility of marketing and shipping the material as a dry powder, enabling the consumer to dissolve the material in an ammoniated vehicle to the concentration desired. At high concentration the material is paste-like and can then be used as a printing ink. Because of its high activity towards cellulose the ink can also be used as a textile dye.

From the foregoing detailed description of my invention, many advantages thereof will be readily apparent to those skilled in the art. The invention provides a simple method of converting water-soluble resorcinol-formaldehyde condensation products to a color base which is extremely suitable for use wherever a water-soluble blue-black color base is desired. The color base of the present invention has extremely high activity toward cellulose which makes it extremely suitable for use for writing or printing on or dyeing or coloring cellulosic materials such as paper or cellulosic textiles. The method of making the color base is simple and economical. A very marked advantage is the ease with which the color base is converted to a dry powder which can be conveniently shipped, handled and stored and at any subsequent time converted back to the color base by simple dissolution in dilute aqueous ammonia. Many other advantages of my invention will be obvious to those skilled in the art.

Having thus described my invention, what I claim and desire to protect by Letters Patent is:

1. A process of making a color base which consists in dissolving in aqueous ammonia a resorcinol-formaldehyde condensation product made by condensing resorcinol with formaldehyde to a stage at which the condensation product is soluble in aqueous ammonia, the mol ratio of resorcinol to formaldehyde ranging from 1.5:1 to 2:1, to form a solution having a pH of at least 7.5, and contacting the body of the resulting solution with an oxygen-containing gas until said solution assumes a dark blue-black color.

2. A process of making a color base which consists in dissolving in aqueous ammonia a resorcinol-formaldehyde condensation product made by condensing resorcinol with formaldehyde to a stage at which the condensation product is soluble in aqueous ammonia, the mol ratio of resorcinol to formaldehyde ranging from 1.5:1 to 2:1, to form a solution having a pH of at least 7.5, and contacting the body of the resulting solution with air until said solution assumes a dark blue-black color.

3. A process of making a color base which consists in dissolving in aqueous ammonia a resorcinol-formaldehyde condensation product made by condensing resorcinol with formaldehyde to a stage at which the condensation product is soluble in aqueous ammonia, the mol ratio of resorcinol to formaldehyde ranging from 1.5:1 to 2:1, to form a solution having a pH of at least 7.5, and bubbling air through the resulting solution until said solution assumes a dark blue-black color.

4. A process of making a color base which consists in dissolving methylene diresorcinol in aqueous ammonia to form a solution having a pH of at least 7.5, and contacting the body of the resulting solution with an oxygen-containing gas until said solution assumes a dark blue-black color.

5. A process of making a color base which consists in dissolving in aqueous ammonia a resorcinol-formaldehyde condensation product made by condensing resorcinol with formaldehyde to a stage at which the condensation product is soluble in aqueous ammonia, the mol ratio of resorcinol to formaldehyde ranging from 1.5:1 to 2:1, to form a solution having a pH of at least 7.5, acidifying the resulting solution and thereby precipitating therefrom a reddish-black water-insoluble precipitate, separating said precipitate, said precipitate being capable of yielding a blue-black solution upon being dissolved in aqueous ammonia.

6. A process of making a color base which consists in dissolving in aqueous ammonia a resorcinol-formaldehyde condensation product made by condensing resorcinol with formaldehyde to a stage at which the condensation product is soluble in aqueous ammonia, the mol ratio of resorcinol to formaldehyde ranging from 1.5:1 to 2:1, to form a solution having a pH of at least 7.5, acidifying the resulting solution and thereby precipitating a reddish-black water-insoluble precipitate, separating said precipitate, and subsequently dissolving said precipitate in aqueous ammonia to produce a blue-black solution.

7. A dark blue-black, oxidized, ammoniacal solution of a resorcinol-formaldehyde condensation product made by condensing resorcinol with formaldehyde in a mol ratio of resorcinol to formaldehyde of from 1.5:1 to 2:1 to a stage at which the condensation product is soluble in aqueous ammonia.

8. A dark blue-black, oxidized, ammoniacal solution of methylene diresorcinol.

9. A reddish-black, water-insoluble powder which upon solution in aqueous ammonia yields a dark blue-black color base, said powder consisting of the precipitate formed upon acidification of a dark blue-black oxidized ammoniacal solution of a resorcinol-formaldehyde condensation product made by condensing resorcinol with formaldehyde in a mol ratio of resorcinol to formaldehyde of from 1.5:1 to 2:1 to a stage at which the condensation product is soluble in aqueous ammonia.

JOSEPH D. ROURK.

REFERENCES CITED

The following references are of record in the file of this patent:

UNITED STATES PATENTS

| Number | Name | Date |
|---|---|---|
| 1,848,077 | Huffman | Mar. 1, 1932 |
| 2,118,431 | Gessler | May 24, 1938 |
| 2,306,863 | Bour | Dec. 29, 1942 |
| 2,426,194 | Fishbach | Aug. 26, 1947 |

FOREIGN PATENTS

| Number | Country | Date |
|---|---|---|
| 99,570 | Germany | Oct. 7, 1898 |
| 596,186 | France | Oct. 17, 1947 |
| 413,628 | Great Britain | Oct. 15, 1932 |

OTHER REFERENCES

Caro, "Ber. Deut. Chem. Ges." 25 (1892), 947.
Mohlan et al., "Ber. Deut. Chem. Ges." 27 (1894), 2888 and 2889.